(12) United States Patent
Kremerman

(10) Patent No.: US 10,159,907 B2
(45) Date of Patent: *Dec. 25, 2018

(54) LAMINAR FLOW DISTRIBUTION ADAPTER

(71) Applicant: Elliot Kremerman, Scotts Valley, CA (US)

(72) Inventor: Elliot Kremerman, Scotts Valley, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/040,769

(22) Filed: Jul. 20, 2018

(65) Prior Publication Data

US 2018/0326322 A1 Nov. 15, 2018

Related U.S. Application Data

(63) Continuation-in-part of application No. 16/003,225, filed on Jun. 8, 2018.

(51) Int. Cl.
- *B01D 5/00* (2006.01)
- *B01D 3/04* (2006.01)
- *B01D 3/14* (2006.01)
- *B01D 8/00* (2006.01)

(52) U.S. Cl.
CPC ............. *B01D 5/0006* (2013.01); *B01D 3/04* (2013.01); *B01D 3/14* (2013.01); *B01D 5/006* (2013.01); *B01D 8/00* (2013.01)

(58) Field of Classification Search
CPC ........... B01D 3/32; B01D 5/006; B01D 5/009
See application file for complete search history.

(56) References Cited

U.S. PATENT DOCUMENTS

| | | | |
|---|---|---|---|
| 1,418,691 A | 6/1922 | Anders | B01D 3/00 422/531 |
| 2,383,377 A | 8/1945 | Evans | G01N 25/145 202/190 |
| 2,427,142 A | 9/1947 | Hornbacher | G01N 25/145 165/11.1 |
| 2,468,872 A | 5/1949 | Goldsbarry | B01D 3/4205 202/185.1 |
| 2,701,789 A | 2/1955 | White | B01D 3/4205 202/161 |
| 3,240,682 A | 3/1966 | Gordon | G01N 25/14 202/158 |
| 3,334,025 A | 8/1967 | Reid | B01D 3/00 202/161 |
| 3,334,966 A | 8/1967 | Shepherd | C01B 6/10 423/294 |

(Continued)

*Primary Examiner* — Jonathan Miller
(74) *Attorney, Agent, or Firm* — Michael J. Feigin, Esq.; Feigin and Fridman LLC

(57) ABSTRACT

A laminar path distillation device receives gaseous and/or liquid condensate material from a condenser. The liquid material exits through a bottom-side portal while the gaseous material is further cooled by way of a chilled coil. Some, all, or substantially all of the gaseous material which enters the laminar path distillation device passes therethrough in a laminar manner until exiting via an exit portal into an apparatus housing a cold trap. As such, the laminar path of the gas is pulled through via a vacuum and also, in embodiments of the disclosed technology, extends on a diagonal slant downwards through the laminar path distillation device or "cow".

19 Claims, 8 Drawing Sheets

(56) References Cited

U.S. PATENT DOCUMENTS

| | | | | |
|---|---|---|---|---|
| 3,607,662 | A | 9/1971 | Glover | B01D 3/14 202/160 |
| 3,812,010 | A | 5/1974 | Nitsch | C13K 3/00 127/41 |
| 3,837,830 | A | 9/1974 | Eberhart | B01L 3/569 422/935 |
| 5,164,049 | A | 11/1992 | Clark | B01D 1/02 134/12 |
| 5,354,428 | A | 10/1994 | Clark | B01D 1/02 159/DIG. 19 |
| 5,873,980 | A | 2/1999 | Young | B01D 5/0063 196/98 |
| 9,682,331 | B2 | 6/2017 | Kremerman | B01D 3/10 |
| D805,600 | S * | 12/2017 | Kremerman | D23/207 |
| 9,895,626 | B2 | 2/2018 | Kremerman | B01D 3/32 |
| 9,895,627 | B2 | 2/2018 | Kremerman | B01D 3/32 |

* cited by examiner

LAMINAR FLOW DISTRIBUTION ADAPTER

FIELD OF THE DISCLOSED TECHNOLOGY

The disclosed technology relates generally to distillation and, more specifically, to distillation equipment with multiple stage condensation.

BACKGROUND OF THE DISCLOSED TECHNOLOGY

Distillation or fractional distillation is carried out by heating a solid or liquid and removing gaseous vapors that are expelled therefrom. This can be done while raising the temperature, as each compound boils at a different temperature. Distribution adapters, also referred to as "cows" due to their appearance which is similar to a cow udder, typically have a centered female joint. The discharge ports ("udders") are either "pushed out" or are pointing downward with three or four typical discharge ports. These other ports offer a traveling pathway for a vacuum (typically used in the distribution adapter) to cause unintentional evaporation of compounds that have a lower boiling point or resilience against a vacuum. This causes partial contamination and depletion of a vacuum.

Further, when distilling multiple fractions (a fraction having a distinct boiling point or range of boiling points within a tolerance level of the distinct boiling point), one typically turns a prior art cow so that the next fraction extends into the next discharge port, which now becomes the lowest port ("lowest" meaning "closest to the surface of the Earth" or "closest to a vector direction in which gravity is pulling"). Those fractions with more energy (e.g. higher boiling point) are distilled later, in a subsequent port, compared to those with less energy. The problem with this method is that the smell of one fraction and it's vapors which have not fully condensed end up in the next fraction, contaminating this next fraction in any or multiple of smell, taste, color, and product.

A general problem with all distribution collection adapters is that even when three ports which are present to receive distillate product evacuated from a distillation head, any condensation or discharge from collected volatile vapors drip as a solid phase solution along the side of the collection assembly itself, and directly drip back into the collection flask. This is the traditional method that has become a customary problem with glassware. As a result, the distillate product becomes contaminated or is less pure than the ideal. Even when using one port, as in U.S. Pat. No. 9,895,627 issued to the same inventor, one must change the distribution head or cow with each fraction which, while a large improvement over the three or four port cow, still leaves room for further improvement.

What is needed in the art is a way to distill or fractionally distill contents in a more pure manner, which means finding a way to increase isolation of distillate fractions to be collected.

SUMMARY OF THE DISCLOSED TECHNOLOGY

A laminar flow adapter in a distillation system has an intake port at a highest point forming a unitary pathway with a condenser. An exit port, for the distillate, is at a lowest point and forms a unitary pathway with a cold trap. The terms "highest" and "lowest" refer to compared to a direction of a pull of gravity. The "lowest" point is that which is closed towards the direction of pull of gravity (such as the center of the Earth) whereas the "highest" point is furtherest therefrom such that gravity pulls from high to low. Thus, the laminar flow adapter, in embodiments of the disclosed technology, is situated, or configured/adapted to be situated such that gaseous vapors enter at a highest point and exit at a lowest point with a linear or nearly linear pathway between these points and the respective intake port and exit port. There-between is either no bend or only a slight bend, which "slight bend" being described at a 25 degree total bend from end to end or less. As such, the longest extent of the laminar flow adapter extends (or is configured, when used) to extend at a diagonal downwards from input to output of distillate. A condensation port extends substantially perpendicular to the linear or nearly linear pathway.

The condensation port, along the bottom side of the laminar flow adapter, has a longest extent which extends parallel to a direction of a pull of gravity (e.g. it's longest extent points downwards). A lowest extent of the condenser extends into and is surrounded by the laminar flow adapter in embodiments of the disclosed technology. Further, the linear or near linear pathway extends substantially in parallel to the unitary pathway of the condenser in some embodiments of the disclosed technology.

Two external chilling ports open into a chilling apparatus passing into said linear or nearly linear said pathway in some embodiments of the disclosed technology. The chilling apparatus partially interrupts the linear or nearly linear pathway while a portion of the linear or the nearly linear pathway of said laminar flow adapter is unimpeded in embodiments of the disclosed technology. The laminar flow adapter is configured to or does drop liquid matter entering through the intake port through the condensation port when in use in embodiments of the disclosed technology.

The laminar flow adapter is configured to or does pass substantially all gaseous matter which enters the laminar flow adapter through the exit port in embodiments of the disclosed technology. Likewise, the laminar flow adapter is configured to pass substantially all gaseous matter through from the intake port to said exit port laminarly (that is, the gas flows in a laminar manner).

In a method of use of the laminar flow adapter, gas passes laminarly after attaching a first end of a linear or near linear path adapter to a lowest end of a condenser, and attaching a second end of the linear or near linear path adapter to an apparatus with a cold trap, the second end being on an opposite side of the first end. A condensation collection apparatus (e.g. a flask) is positioned below a condensation port disposed at a gravitational bottom of the linear or near linear path adapter. Then the gaseous distillate is passed laminarly through from a condenser into the first end to the second end of the linear or near linear path adapter.

The other devices and their functions described above can also be used in the method of carrying out the laminar flow distillation. For purposes of this disclosure "laminar", "laminarly", and "laminar flow" are defined as "in a constant stream lacking turbulence or turbulent flow". A "condenser" is defined as "a tubular device through which vapors exit after being fractionally distilled and begin to be condensed into liquid". A "cold trap" is defined as "a device connected to a vacuum which condenses vapors and prevents the vapors from passing into a vacuum apparatus."

Any device or step to a method described in this disclosure can comprise, or consist of, that which it is a part of, or the parts which make up the device or step. The term "and/or" is inclusive of the items which it joins linguistically and each item by itself. Any element or described portion of the devices shown can be "substantially" as such, if used in the claims in this manner. Where used, "substantially" is defined as "within a 5% tolerance level thereof."

DETAILED DESCRIPTION OF EMBODIMENTS OF THE DISCLOSED TECHNOLOGY

The new technology described herein has a built-in "monocow". Monocow is a registered trademark, U.S. Pat. No. 5,390,629 having goods listed, at the time of this writing, as "Distillation apparatus for scientific purposes; Laboratory glassware". For purposes of this disclosure, "monocow" is defined as a distribution adapter with a single exit port for a condensed fraction. A distribution adapter is a device used to receive previously vaporized and now condensed (into liquid) distillate which has typically or has passed through a distillation head. A "distillation head" is defined as a device in which vapors of a solid, liquid, or combination solid and liquid product to be distilled move upwards therein before exiting into a distribution adapter.

In embodiments of the disclosed technology, a monocow is attached to a trap and the condensing vapors/liquid (herein, "distillate") is prevented from being pulled path the trap and into the vacuum. A "trap" is a device which holds, adjacent to but outside of the flow path of the distillate (condensing vapor or liquid being distilled), ice or another cold medium which causes turbulent flow and cooling of the distillate. For purposes of this disclosure "distillate" refers to and is defined as the vapor, liquid, or combination thereof which exits from the distillation head and is ultimately fractionally distilled into component parts, each component part having different physical properties such as a different boiling point.

Prior art traps or cold traps are typically glass bungs (stopper-type devices) which extends into another glass enclosure allowing a cold surface to condense warm vapors and protect vacuum systems. A drawback of prior art traps is that vapors move past the traps at too high a velocity to be significantly cooled thereby when, for example, the connections therein and there-out are increased to anything beyond a diameter of about ½ or ⅜ of an inch. When vapors continued past a trap, not only are the vapors lacking in proper separation into the collected fractions, but higher volume pumps are used.

In order to solve the problem of both the limitations of prior art pumps and prevent having multiple exit points for fractions of the fractionally distilled distillate, a laminar path monocow is used in embodiments of the disclosed technology.

Figure 1:
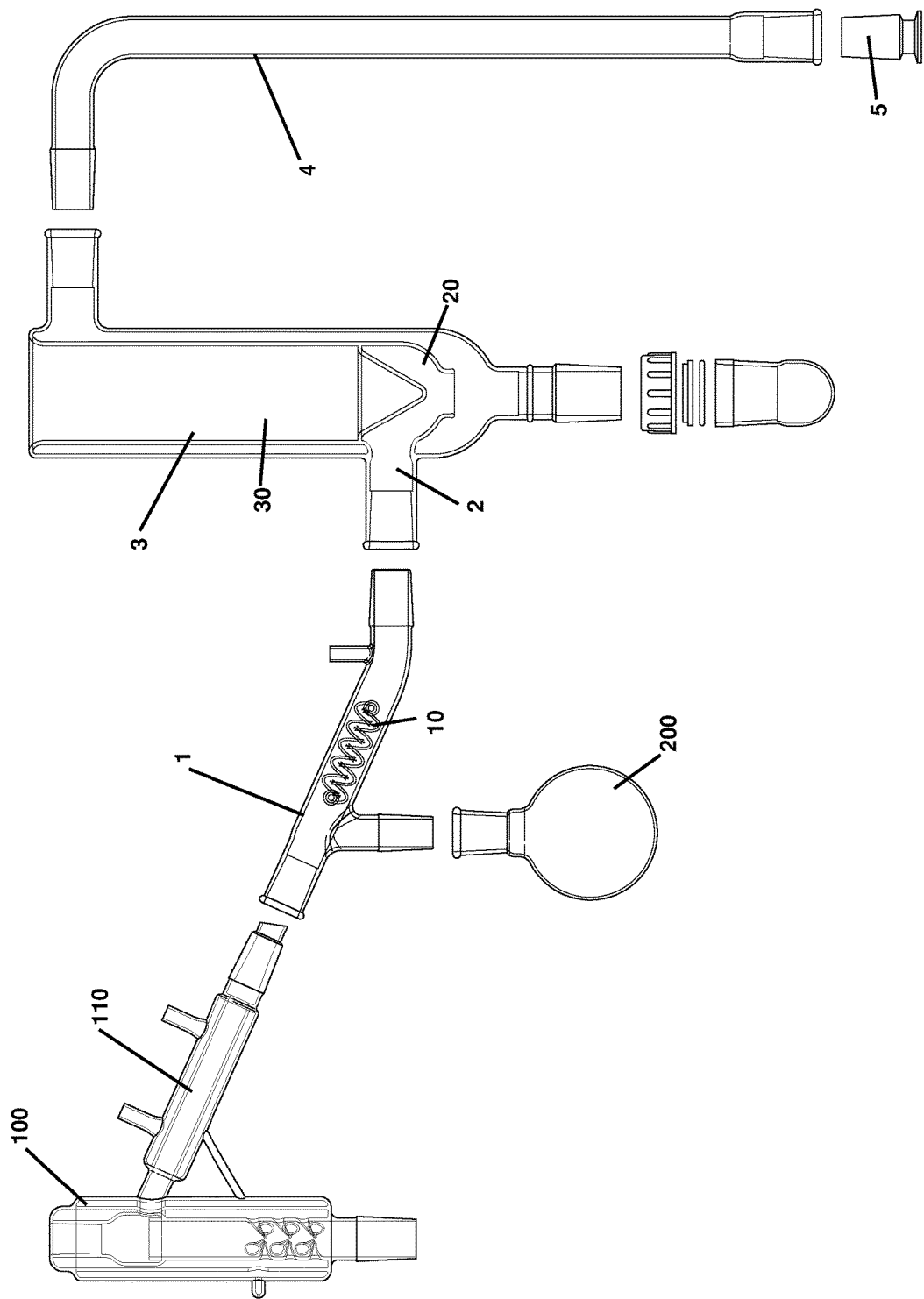
FIG. 1 shows a high level diagram of the distillation equipment used in embodiments of the disclosed technology.
Figure 2:
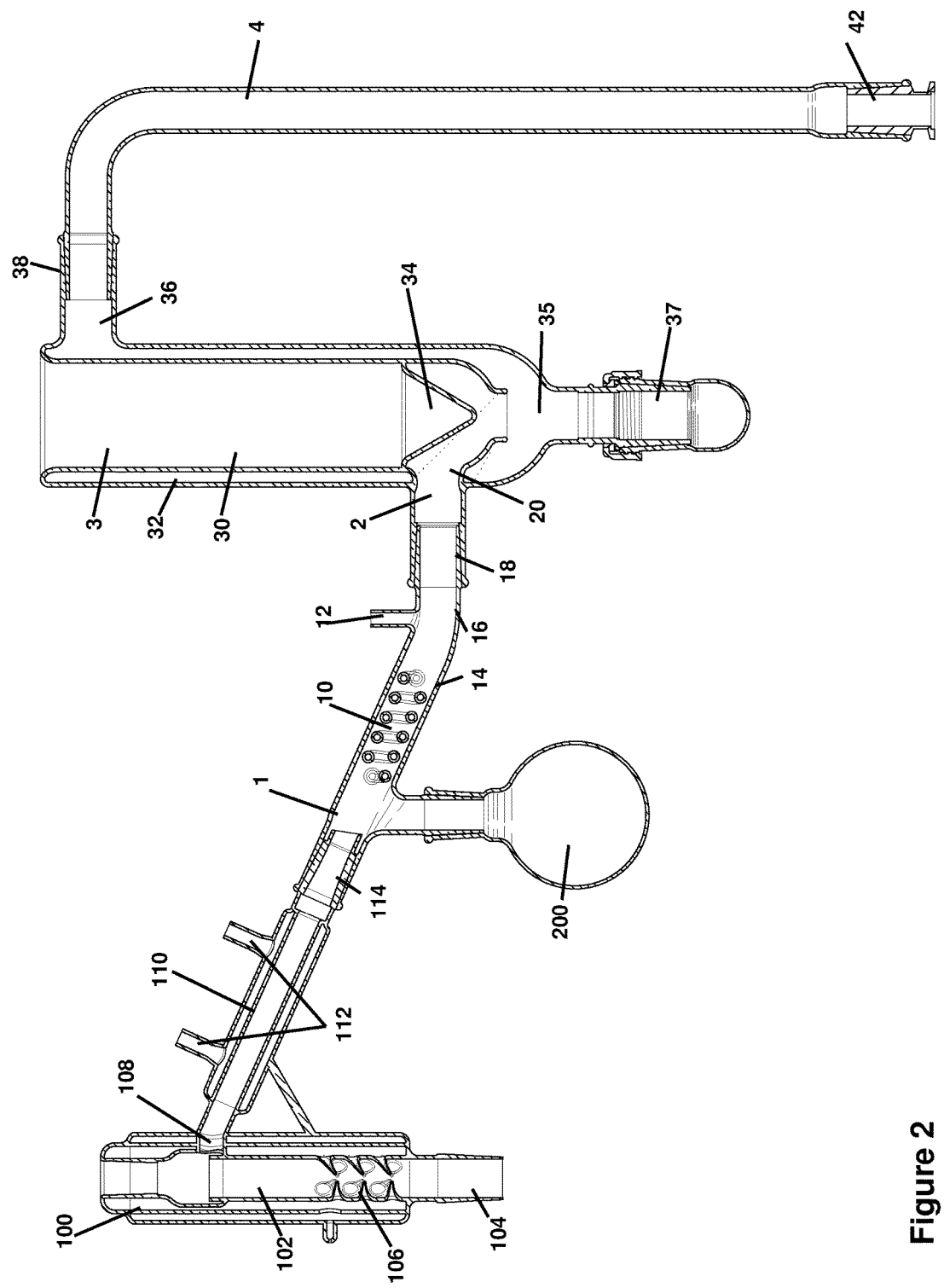
FIG. 2 shows a cutaway view of the distillation equipment of FIG. 1.
Figure 3:
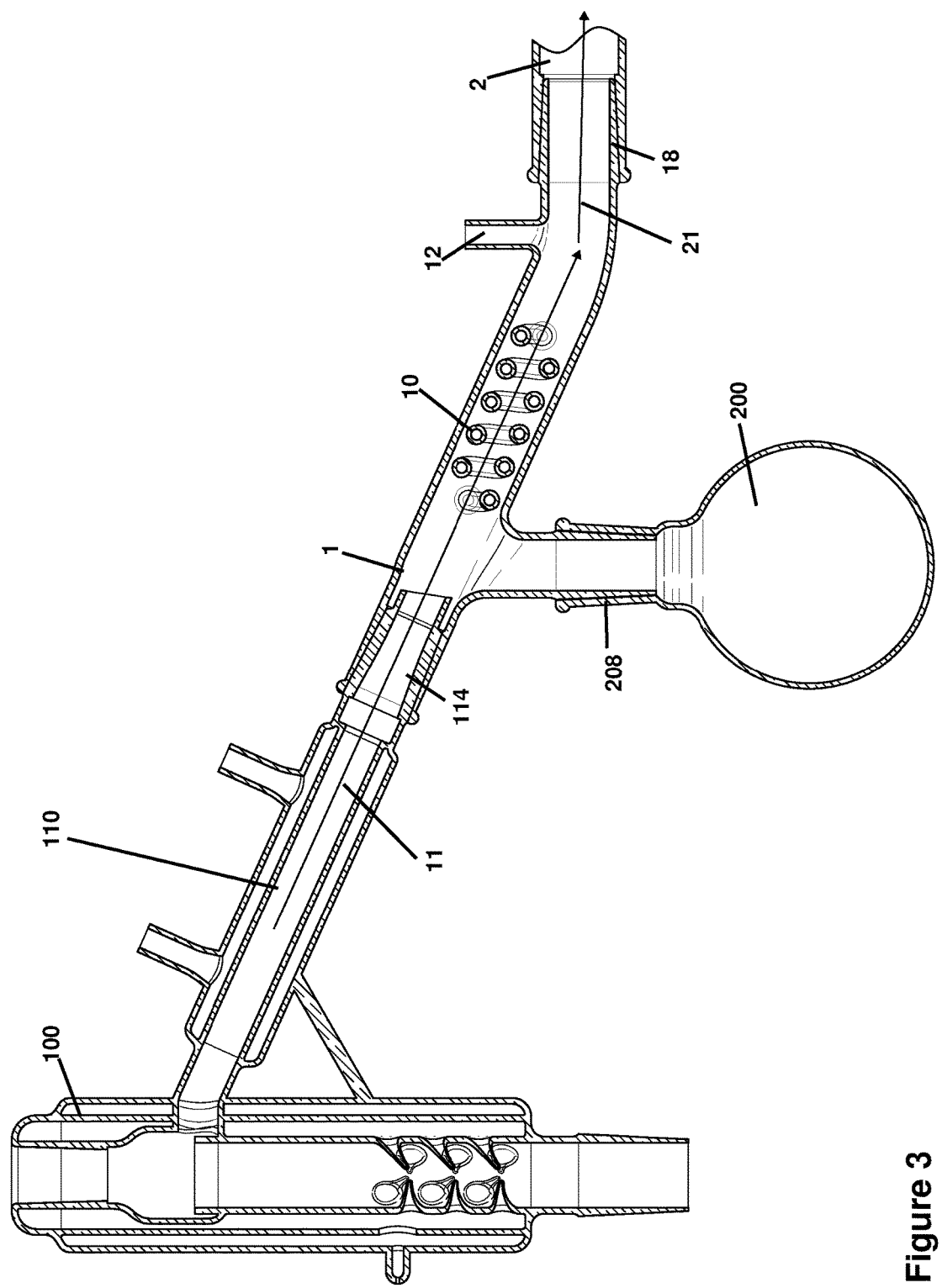
FIG. 3 shows a direction of flow through a distribution adapter into a dual stage cold trap used in embodiments of the disclosed technology.
Figure 4:
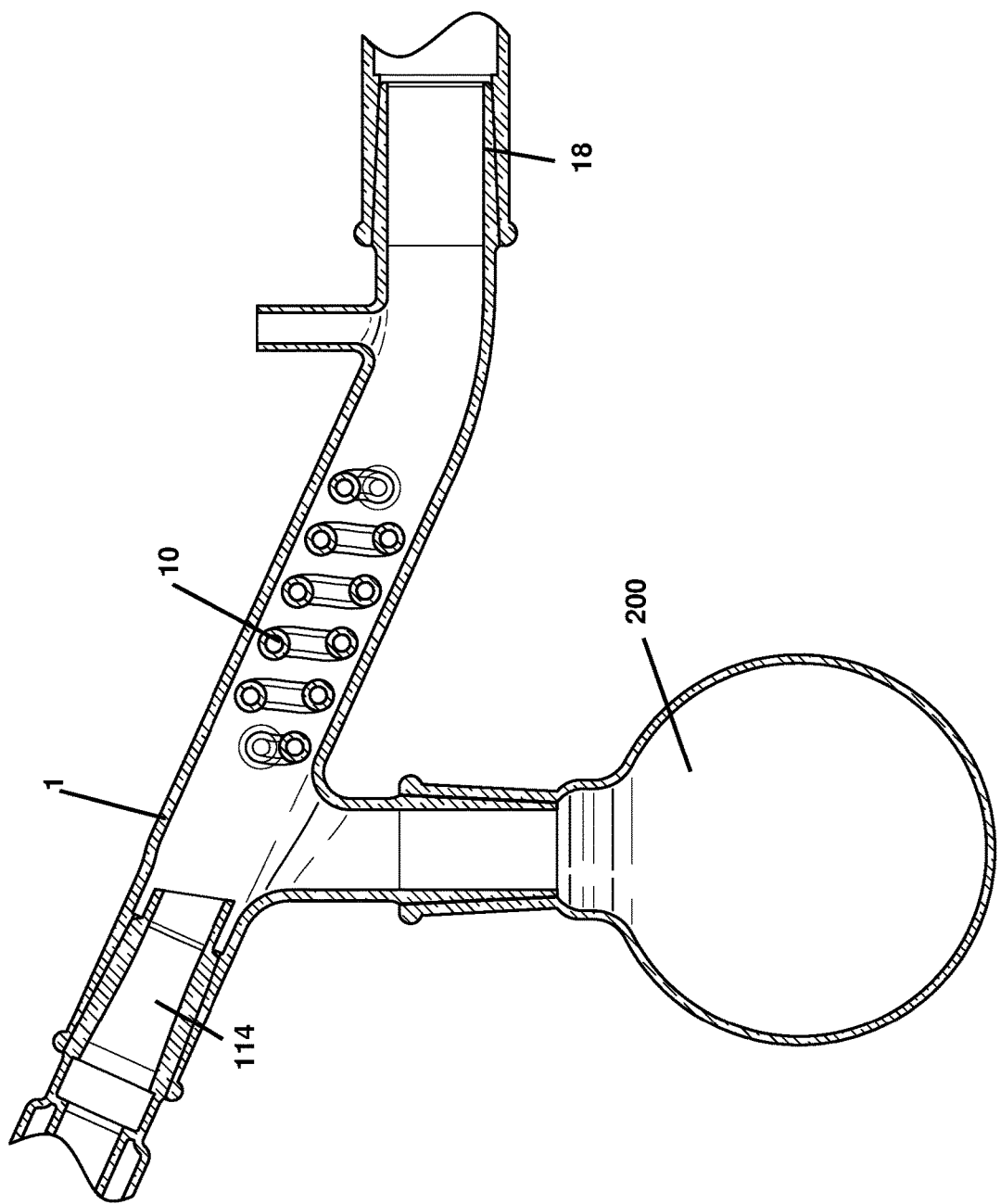
FIG. 4 shows a closer view of the laminar path distribution adapter in the system of embodiments of the disclosed technology.
Figure 5:
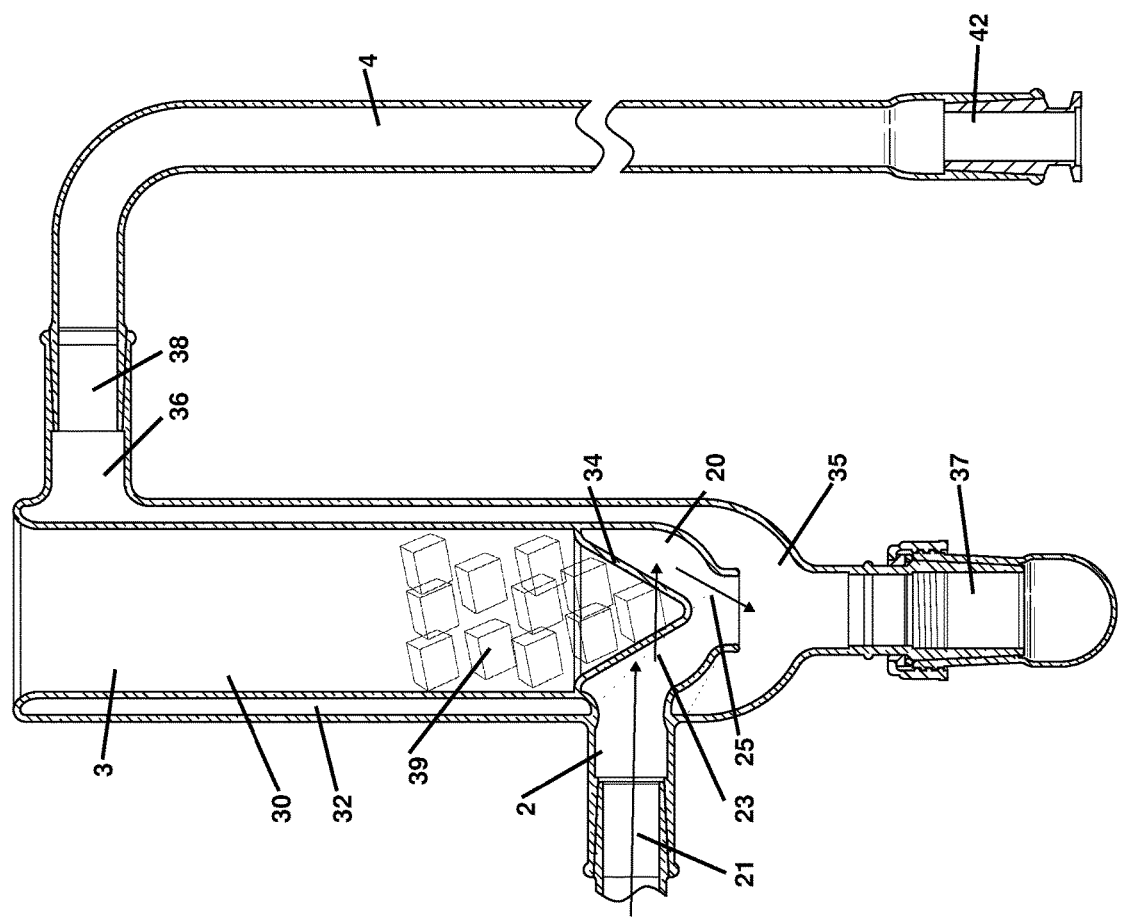
FIG. 5 shows a closer view of the cold trap in the system of embodiments of the disclosed technology.
Figure 6:
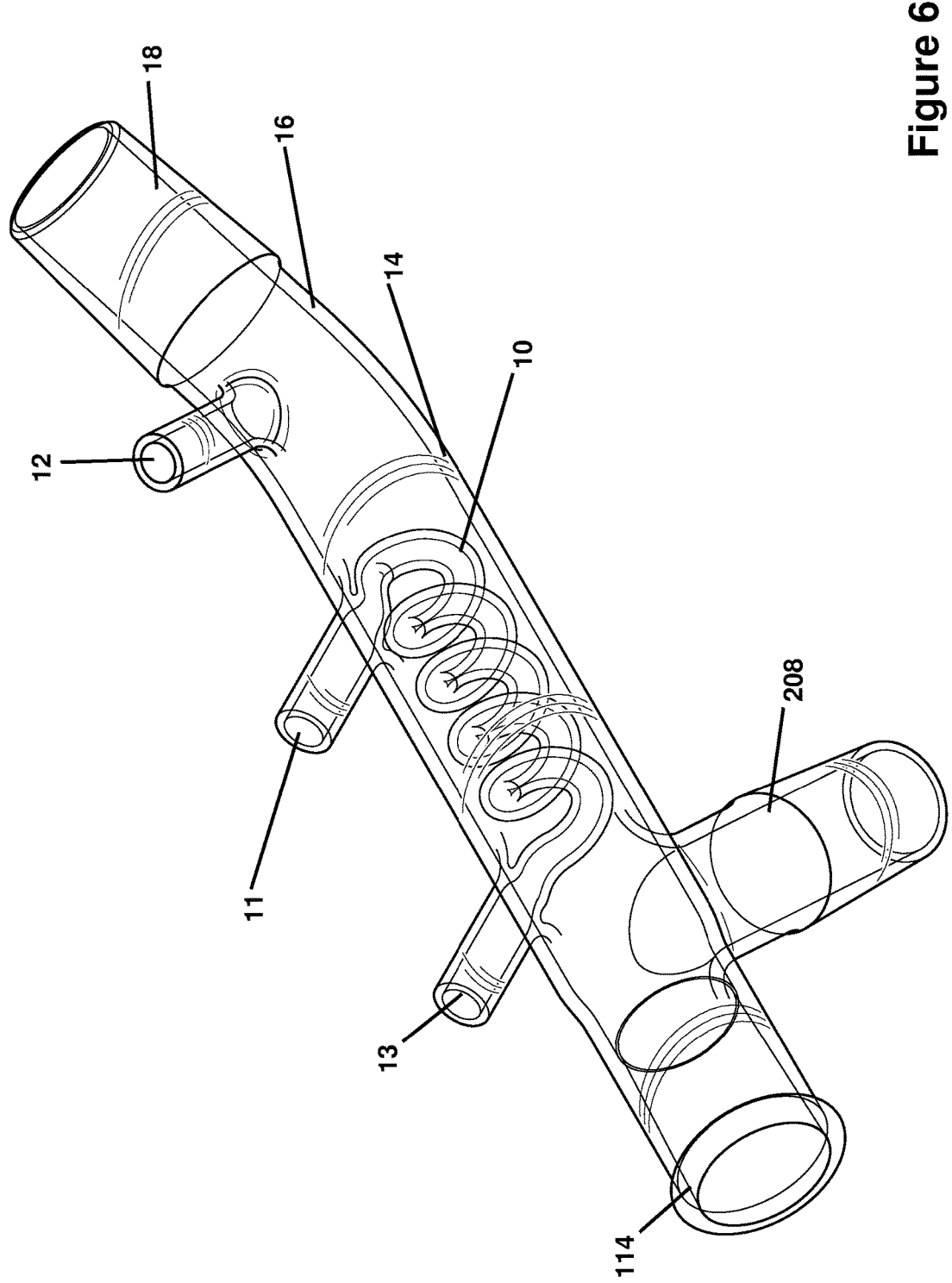
FIG. 6 shows a perspective view of the laminar path distribution adapter of embodiments of the disclosed technology.
Figure 7:
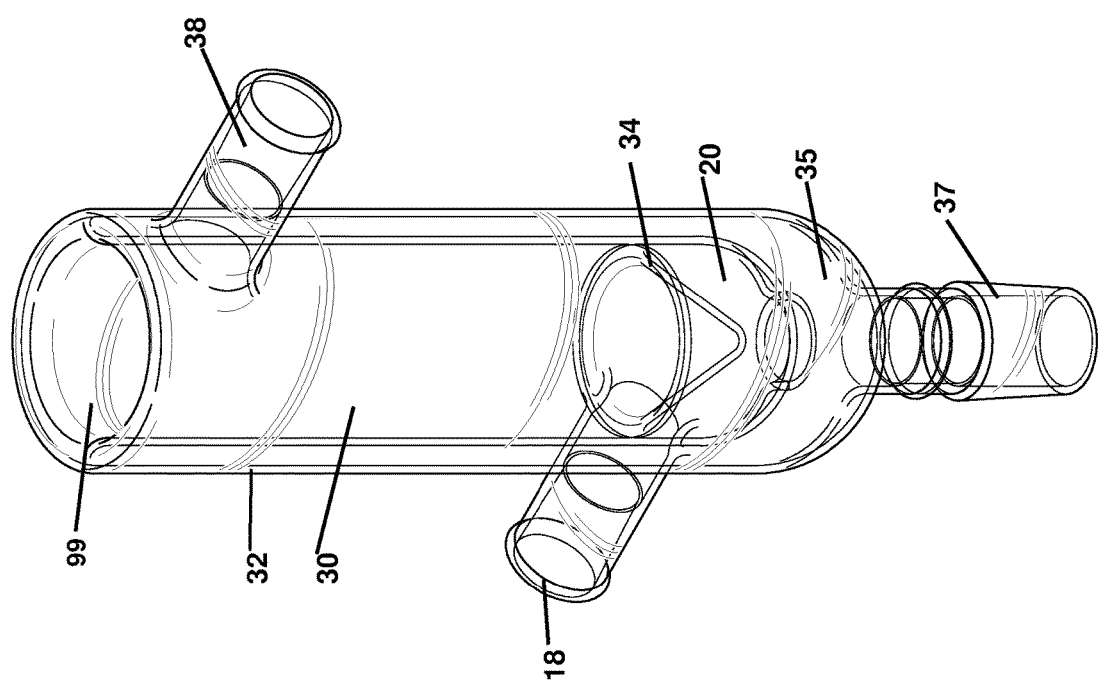
FIG. 7 shows a perspective view of the cold trap of embodiments of the disclosed technology.

The technology is best understood in view of the following discussion of the stages of distillation and figures. Discussing the figures simultaneously, FIG. 1 shows a high level diagram of the distillation equipment used in embodiments of the disclosed technology. FIG. 2 shows a cutaway view of the distillation equipment of FIG. 1. FIG. 3 shows a direction of flow through a laminar path monocow into a dual stage cold trap used in embodiments of the disclosed technology. FIG. 4 shows a closer view of the laminar path monocow used in embodiments of the disclosed technology. FIG. 5 shows a closer view of the dial stage cold trap used in embodiments of the disclosed technology. FIG. 6 shows a perspective view of the laminar path distribution adapter of embodiments of the disclosed technology. FIG. 7 shows a perspective view of the dual stage cold trap of embodiments of the disclosed technology.

The different areas of temperature 2 and 3 are thus one continuous unitary piece. The dry ice or mechanical cooling of the warmest part of the bung (the bung being the region enclosed by elements 30 and 34) causes the inverted cup region 34 to stay at substantially a same temperature as the rest of the bung. Combined with the cooling in stage 1, in this second stage the cooling is more effective than known in the prior art because the molecules are cooled a second time in stage 2 preventing wet or liquid molecules from condensing in stage 3 and more importantly, in stage 4. There is a prior art problem of water entering the vacuum apparatus such as through hoses to the vacuum. By way of the arm 4 with a right angle curve, in some embodiments, and the dual stage cooling this is prevented and distillation is purer and can continue longer uninterrupted than known in the prior art. The upper stage 3 portion stays near the temperature of the cooling material 39 placed therein. This is due to prevention of substantially all or all molecules rushing through the system without being cooled. For purposes of this disclosure, remaining "cold" or "at the same temperature" is within 5 degrees Celsius and "being cooled" refers to being cooled at least 20 degrees Celsius.

The disclosed trap was able to achieve during distillation with a full high cfm load at the lowest vacuum rating 2e-9 with a dry unloaded glass rating of 5e-11 using apiezon 501 grease and a digivac stratavac in testing. This trap not only offers a 3 stage inline cooling and vacuum protection feature but also was able to enhance vacuum depths on expensive diffusion setups without contamination of the vacuum pump or the pathway to the pump. More amazing invention novel to the build out is the increased distillation speeds. This specific connection increased all industry distillation speeds 3× what they were with hoses. Where a distillation could occur at 1000 ml per hour in the prior art, the present trap exceeds 3000 ml per hour during standard usage. The simple loss of hoses and conversion to this 3 stage system allows for this increase in speed and vacuum protection.

The stages of distillation proceeds with fractional distillation using, for example, a vertical distillation chamber 100 which has a vertical pathway 102 for vapors to rise through and exit through a side portal 108. Pinched regions and/or Raschig rings 106 can be placed within the vertical chamber and the substance to be distilled can be placed in a flask or the like below a lower portal 104. The distillate then enters a condenser 110 which can be cooled by way of a water jacket with inlets 112. These elements 100 through 112 as well as element 200 are described further in both U.S. patent application Ser. No. 15/886,962 filed Feb. 2, 2018 and U.S. Pat. No. 9,895,626 where are hereby incorporated by reference in their entirety.

Once the distillate exits from the condenser through port 114 (the exiting end of the condenser which is placed, in embodiments of the disclosed technology, within the entrance tube of the distribution adapter 1/monocow), the distillate enters the distribution adapter 1. For purposes of this disclosure, an "entrance" or "entrance tube" it at an end of the system or a device which is more proximal to the beginning of the distillation process. An "exit" or "exit tube" is at an end of the system or a device which is more proximal to the end of the entire system or a device. In general, the distillation proceeds from the lower port 104 (the "entrance") through the vertical distillation tube 102, out the exit portal 108, and in a direction from left to right through the system and devices shown in FIGS. 1 and 2.

At a high level, embodiments of the disclosed technology further the distillation through the distribution adapter 1, or monocow, with an entrance at 114 and condensation port 208 and 18. The condensation port 208 of the distribution adapter (which is entrance 208 of the flask 200) extends into a collection flask 200 where liquid discharge drains off and out of the system. However, downstream from the flask 200 is a coil 10 followed into a second temperature region 2, a lateral region comprising one or both of the end of the distribution adapter and beginning of a cold trap, and then a third temperature region 3 which is entirely in the cold trap. Thus, element 1 refers to both a temperature region and the distribution adapter and temperature region 3 refers to both a temperature region and the cold trap. Element 2 is a temperature region alone within the lateral sections and/or entrance/exits of elements 1 and 3. Temperature region 1 is, in embodiments of the disclosed technology, hotter than region 2 which is in turn hotter than region 3. Region 3 is filled with ice (from water) or in some embodiments, cooled or chilled liquid or solids.

Referring now to FIG. 6, the perspective view of the laminar path distribution adapter (monocow), in this view one can clearly see the coil 10. The flow path is from the portal 114 through the portal 18 past the coil 10 which cools, in the first cooling of the distillate product. There is no bend or only a slight bend at 16 to the exit portal 18 allowing for the laminar and non-turbulent flow. The coil can be filled with a cooling substance through portals 11 and 13, the cooling substance flowing there-through.

The bend angle, from input portal 114 to exit portal 18 is at 25 degrees or less and in some embodiments, the bend is limited to an exit side of the monocow. The "exit side" is between the coil/condensation tubes 10 and exit portal 18. Where the coil is situated through to the upper side of the device at the input portal 114 is completely linear/straight in some embodiments of the disclosed technology. Vapors which flow into the entry port 114 pass through laminarly and angled downwards until exiting out of the exit port 18. Liquids, however, which were condensed in the condenser, fall downwards through the condenser/exit port 208 into an apparatus there-below to catch such liquid, such as into a flask 200. The linear/laminar flow of the gas through the laminar path distribution adapter/linear path adapter is, in some embodiments, a continuation of a direction of flow, which may be laminar, in the condenser. As such, the flow can be laminar from a condenser, through the distribution adapter (which is differentiated from a condenser with the presence of an exit portal for liquid condensate), and into a cold trap. Further, while the coil interrupts some of the flow path, the flow path between and around the coil remains uninterrupted and laminar in embodiments of the disclosed technology.

FIG. 7 shows a perspective view of the bung or inverted cup/cone chiller. Here, the chilling material (such as ice 39, shown in FIG. 5 with is representative of any solid chilling material) is placed through the upper portal 99 into the interior region 30 and 34, the interior regions forming a unitary space. An optical illusion makes the portal 18 look like it enters above the cone 34, but in actuality the entrance of distillate vapors is to beneath the cone 34 into the interstitial space 20. The liquid materials drop through the bottom exit portal 37 after being chilled in the interstitial space 20 while the vacuum pulls through the portal 38 and between the outer walls 32 and chilling bung 30/34. In this manner, no vapors can exit from region 20 into 35 and enter the vacuum. Vapors are "stuck" in region 20 once reaching this location and exit only when cooled to a liquid and dropping through to bottom exit portal 37.

Referring now specifically to FIGS. 3 and 5, note the pathway of the distillate. The vapors exit the condenser 110 in the direction 11 into the laminar path distribution head 1. Any liquid falls into the flask 200 while the vapors then continue along path 21 into (jump to FIG. 5) the cold trap. The laminar flow is now changed to a cyclic, vortex, or circular type flow 23 where the vapors condense due to the cold nature of lower conical/cone-shaped portion 43 of the trap which is maintained at a designated cold temperature due to the presence of chilling fluid and/or solid therein. The vapors then fall along path 25 (at an angle as shown or straight down), the liquid having mass causing the liquid to drip down through the bottom portal 37. All the while, a vacuum is pulling through element 4, the solid and non-bending vacuum apparatus, in embodiments of the disclosed technology. This vacuum extends through regions 38, 36, between 32/30, and into the space within the laminar path distribution adapter 1.

Now describing each section in more detail, the novelty of the technology should become more clear.

Element 1: Distribution Adapter (Laminar Path Monocow).

The distribution adapter 1 is a laminar path monocow. "Laminar path" is defined, for purposes of this disclosure, as passing there-through a device with a lack of vortexes or turbulent flow. That is, in the distribution adapter, the distillate which entered from the condenser 110 as a liquid falls away into the flask 200 by way of gravity. However, the vapor distillate continues with laminar flow (without turbulence or substantial change in direction) through to the exit port 18 of the distribution adapter. Note that the side walls of the distribution adapter 1 have no sharp turns (defined as "greater than 40 degrees") but rather only gradual turns (defined as "less than or equal to 40 degrees") or slight turns (defined as "less than or equal to 25 degrees"). Thus, the distribution adapter in embodiments of this technology handles both vapor and liquid in a single unit. The added port 12 is used for a vacuum port which can be at a top side of the device (where the flask 200 and lower port 104 represent a lower or bottom side of the system at their respective locations and a side opposite same is an upper or top side).

After the vapors are leaving the distillation head apparatus 100 the vapors are, in embodiments of the disclosed technology, at their hottest at port 108 at any time after leaving the distillation apparatus. While under vacuum, using a vacuum at port 12, there are still molecules rushing through a condenser and out of prior art systems. Thus, in the prior art, at least some molecules remain above a desired condensation temperature throughout the entire process of distillation. Some vapors which have molecules moving faster than can be cooled through the condenser or distillation head enter the cold trap at an elevated velocity (and temperature) which prematurely heats up the internal bung of any cold trap with warm vapors and prevents the trap from being as effective. What is desired, and what functions better than prior art systems here is that the cold trap 30 with lower cone 34 remains cold due to the greater pre-chilling of molecules through the path 1 and the beginning of 2 prior to contacting walls of the cold trap 30/34 or coming into a section immediately around or beneath the cone 34 of the cold trap 34. The cone of the cold trap is, in embodiments of the disclosed technology, a narrowing or cone-shaped (using the mathematical definition of "cone") section with a wider top side and narrower bottom side. The area "immediately around" same refers to the area defined by squaring off the cone if the narrowest portion where of equal area to the widest portion, as well as the area beneath the tip of the cone which is as wide as the widest part of the cone and lower than the lowest tip of the cone at a length of ¼ of the total height of the cone from top to bottom. Note that the "cone" for purposes of this disclosure has a top most region which meets with and has a continuous internal housing with a section of the cold trap 30 with a same width or at least as wide a width as the widest portion of the cone.

In this manner, the path of molecules form the portal 108 through the condenser 110 and into the distribution adapter 1 proceed without hoses or obstruction. Hoses of the prior art provided contamination with molecules piling along the glass surfaces and connectors. Here, there is an internal corkscrew chiller 10 which cools while at the same time there is laminar flow of the molecules of the distillate through the distribution adapter. The distillate passes around the corkscrew chiller 10 which can have any of cold water, acetone, alcohol, or the like. Temperatures of −80 to −100 Celsius can be reached with the chiller 10 or with the cold trap 30. (The cold trap 30 can also use dry ice or another solid.)

Dual Stage Cold Trap Including: Element 2: Cone Trap and Element 3: Upper Trap The dual stage cold trap or inverted cup cold trap has an inverted cup or cone 45 which is wider at the top and narrower at the bottom. The cone 45 joins with and shares a continuous internal space, in embodiments of the disclosed technology, with a larger storage area for cold material such as, as described above, dry ice, water ice, or the like. An external chilling apparatus can be used to cycle cold material into the space of elements 30 and 34 to keep the cone 34 and area immediately there-around 20 (and within the walls of the cold trap device) below a designated temperature.

The cone or inverted cup 34 prevents any high velocity vapors from entering the upper (coldest) part of the trap (numbered 3, where the vapors exit the trap through exit area 36 and the portal 38) and prevents heat from rising anywhere past the lower section (stage 2). This is the second cooling feature in this distillation cold trap path, the first being at the corkscrew chiller 10, in embodiments of the disclosed technology. The vapors in the path 2 thus rotated around the cone 34 forming a cyclone or cyclical path. This creates a molecular centrifugal force and throws heavy and light molecules along the sides/wall of the inverted cup 34. The cup wall now collects all super volatile and pre-cooled minor volatiles from stage 1 and allows them to simply drip down into the collection flask past the inverted cup in stage 2. Such super volatile and pre-cooled minor volatiles then pass into the lower vacuum area 35 of the cold trap and out through a bottom portal 37 as a solid in some embodiments of the disclosed technology.

The stage 3 area, which is roughly above the cone 34 within the traps outer walls 32, stays cold, relative to section 2, and dry, relative to section 2. This prevents warm or wet molecules or any or substantially any of the distillate from entering a vacuum pump are dropped through portal 37 of the cold trap. Given that the cone 34 is surrounded by interstitial space 20 which is in turn surrounded by the lower vacuum area 35 at the bottom side, the only energy input needed to separate the warm and wet molecules from the dry and cooler molecules in the cold trap is the cooling of the cold trap 30/34 itself. Thus, vapors are cooled entirely into liquids before the distillate, which is now a liquid, can exit from the region 20 to the region 35 where the mass prevents the liquid from being sucked into the vacuum and into the region between 30 and 32 or out the vacuum port 42. Liquids, rather, drop from 20 through 35 and out bottom exit port 37. The inverted cup or cone 34 is formed in unitary construction as one piece with the cold trap 30 and the outer walls 32 thereof in embodiments of the disclosed technology. Cooling energy from the bung itself (within the walls of the cold areas/cold trap 30 and 34) are transferred to the inverted cup much more efficiently than known in the prior art. This is monumental because the effect of Stage 2 cooling area is so effective the upper portions of the trap, in at least some uses of the system to distill a substance, lack passage of hotter (at the temperature of stage 1) or miscellaneous molecules into a vacuum pump.

Element 4: Arm Discharge Region

An arm 4, made out of glass in embodiments of the disclosed technology, engages out output port 38 of the cold trap which has a passage into the outer walls 36 of the cold trap 3. The output port of the cold trap/input port of the arm discharge region 38 is stainless steel in embodiments of the disclosed technology, such as the male end of the arm. The stainless steel variant has been verified with AVS (American Vacuum Society) standard to retain up to −10 scale vacuum along with the other joints. This also allows a full bore connection to the pumps without using hoses for passage of distillate/product there-through. It should be understood that any of the elements described or shown in the figures of this disclosure can be made from an inert glass, metal, or combination thereof.

Figure 8:
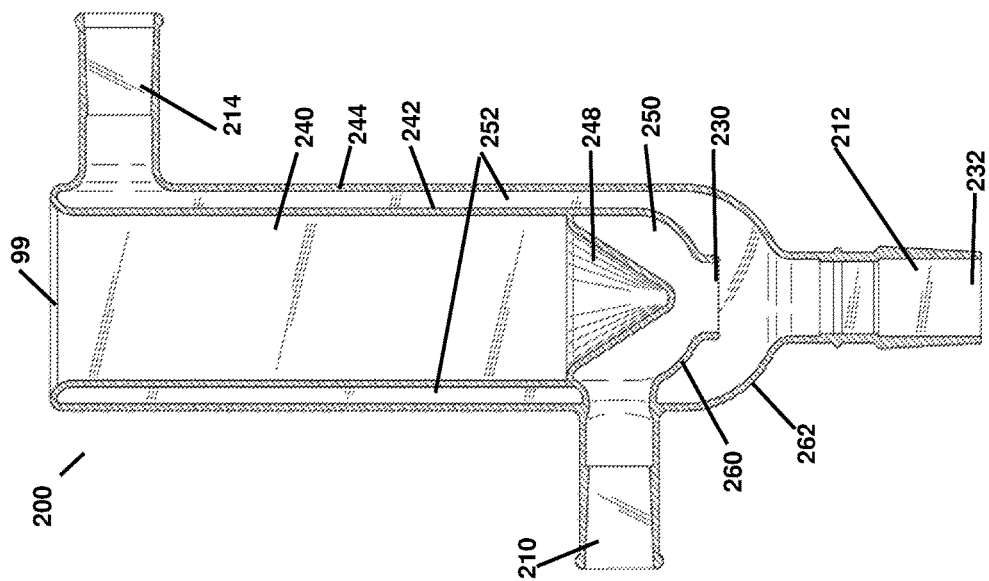
FIG. 8 shows a reverse and lower side perspective view of the cold trap of embodiments of the disclosed technology.
Figure 9:
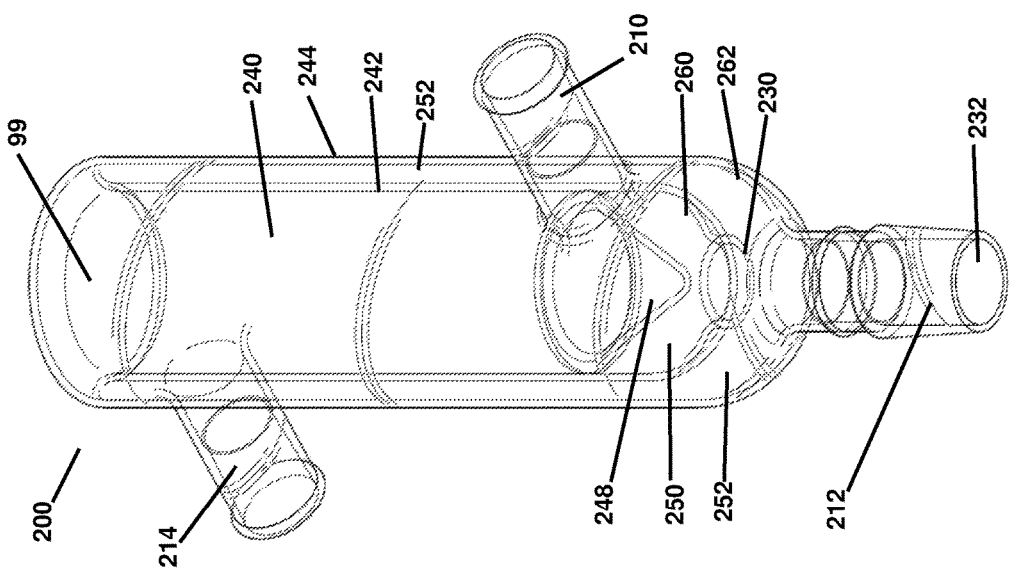
FIG. 9 shows a vertical cutaway view of the cold trap of embodiments of the disclosed technology.

FIG. 8 shows a reverse and lower side perspective view of the cold trap of embodiments of the disclosed technology. FIG. 9 shows a vertical cutaway view of the cold trap of embodiments of the disclosed technology. Though the cold trap 200 shown in these figures can be identical those in the earlier figures, they are shown here with different element numbers in order to emphasis other specific parts thereof. There are joined side walls 242 and 244 at the top which bifurcate to create an outer region or evacuation region 252. The inner side wall 242 extends downwards until having a curvilinear bottom side 260 while the outer side wall 244 extends downwards until having a curvilinear bottom side 262. Within the inner side wall is a cylindrical section 240 which joins together with a conical section 248. The cooling liquid/solid described above is placed herein through the top portal 99 in embodiments of the disclosed technology.

Through the side portal 210 vapors flow in in some embodiments of the disclosed technology. This vapors enter the cooling region 250 defined by the inner side walls 242 and conical section 248 (cone). The inner bottom walls 260 and bottom portal 240 also define the cooling section in some embodiments. Laminar flow of vapors through the portal 210 turns into a vortex or turbulent flow around the cone 248 which can be much cooler than the ambient temperature and/or the vapors. This causes the vapors to condense and fall through both portal 230 and 232 of the respective inner and outer side walls.

A vacuum can pull gas through the portal 214 such that there is flow of gas (e.g. air) from portal 210, through the region 250, then the region 252, and out the portal 214. However, the vapors are warmer and stay in the section 250 (do not fall into the evacuation section/region 252) until condensing into a liquid. As a liquid, the vacuum lacks the strength to pull same upwards through the section 252 which is further cooled by material within the space 240 which causes condensation of any vapors might make it there-in and fail to fall downwards through the bottom tube 212 and out the bottom portal 232.

While the disclosed technology has been taught with specific reference to the above embodiments, a person having ordinary skill in the art will recognize that changes can be made in form and detail without departing from the spirit and the scope of the disclosed technology. The described embodiments are to be considered in all respects only as illustrative and not restrictive. All changes that come within the meaning and range of equivalence of the claims are to be embraced within their scope. Combinations of any of the methods, systems, and devices described herein-above are also contemplated and within the scope of the disclosed technology.

I claim:

1. A laminar flow adapter in a distillation system comprising:
    an intake port at a highest point forming a unitary pathway with a condenser;
    an exit port at a lowest point forming a unitary pathway with a cold trap;
    a linear or nearly linear pathway between said highest point intake port and said lowest point cold trap of said laminar flow adapter having at most, a slight bend between;
    a condensation port extending substantially perpendicular to said linear or nearly linear pathway.

2. The laminar flow adapter of claim 1, wherein said slight bend is at or less than 25 degrees between said intake port and said exit port.

3. The laminar flow adapter of claim 2, wherein said condensation port has a longest extent which extends parallel to a direction of a pull of gravity.

4. The laminar flow adapter of claim 3, wherein a lowest extent of said condenser extends into and is surrounded by said laminar flow adapter.

5. The laminar flow adapter of claim 4, wherein said linear or near linear pathway extends substantially in parallel to said unitary pathway of said condenser.

6. The laminar flow adapter of claim 5, further comprising two external chilling ports with a chilling apparatus passing into said linear or nearly linear said pathway.

7. The laminar flow adapter of claim 6, wherein said chilling apparatus partially interrupts said linear or nearly linear said pathway while a portion of said linear or said nearly linear said pathway of said laminar flow adapter is unimpeded.

8. The laminar flow adapter of claim 7, wherein said laminar flow adapter is configured to drop liquid matter entering through said intake port through said condensation port.

9. The laminar flow adapter of claim 8, wherein said laminar flow adapter is configured to pass substantially all gaseous matter which enters said laminar flow adapter through said exit port.

10. The laminar flow adapter of claim 9, wherein said laminar flow adapter is configured to pass said substantially all gaseous matter through from said intake port to said exit port laminarly.

11. A method of laminar flow distillation, comprising the steps of:
    attaching a first end of a linear or near linear path adapter to a lowest end of a condenser;
    attaching a second end of said linear or near linear path adapter to an apparatus with a cold trap, said second end being on an opposite side of said first end;
    positioning a condensation collection apparatus below a condensation port disposed at a gravitational bottom of said linear or near linear path adapter;
    passing gaseous distillate laminarly through from said first end to said second end of said linear or near linear path adapter.

12. The method of laminar flow distillation of claim 11, a bend between said first end and said second end is at or less than 25 degrees.

13. The method of laminar flow distillation of claim 12, wherein said condensation port has a longest extent which extends parallel to a direction of a pull of gravity.

14. The method of laminar flow distillation of claim 13, wherein a lowest extent of said condenser extends into and is surrounded by said linear or near linear path adapter.

15. The method of laminar flow distillation of claim 14, wherein said linear or near linear pathway extends substantially in parallel to a unitary pathway of said condenser.

16. The method of laminar flow distillation of claim 15, further comprising two external chilling ports with a chilling apparatus passing into said linear or near linear path adapter.

17. The method of laminar flow distillation of claim 16, wherein said chilling apparatus partially interrupts flow in said linear or nearly linear adapter while a portion of said linear or said nearly linear said adapter has uninterrupted laminar flow.

18. The method of laminar flow distillation of claim 17, wherein liquid matter entering through said first port is dropped through said condensation port.

19. The method of laminar flow distillation of claim 18, wherein substantially all gaseous matter which enters through said first end passes laminarly to said second end.

* * * * *